United States Patent
Hong et al.

(10) Patent No.: US 7,084,220 B2
(45) Date of Patent: Aug. 1, 2006

(54) CATALYST SYSTEM FOR PREPARING STYRENE POLYMER AND METHOD FOR PREPARING OF STYRENE POLYMER USING THE SAME

(75) Inventors: Moo-Ho Hong, Daejeon (KR); Boo-Gon Woo, Daejeon (KR); Young-Suk Son, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/505,915

(22) PCT Filed: Feb. 5, 2004

(86) PCT No.: PCT/KR2004/000213

§ 371 (c)(1),
(2), (4) Date: Aug. 27, 2004

(87) PCT Pub. No.: WO2004/069880

PCT Pub. Date: Aug. 19, 2004

(65) Prior Publication Data

US 2005/0171308 A1    Aug. 4, 2005

(30) Foreign Application Priority Data

Feb. 5, 2003  (KR) ............... 10-2003-0007170
Feb. 4, 2004  (KR) ............... 10-2004-0007310

(51) Int. Cl.
*C08F 4/64*   (2006.01)
*C08F 12/08*  (2006.01)

(52) U.S. Cl. .......... 526/160; 526/131; 526/134; 526/904; 502/103; 502/109; 502/117

(58) Field of Classification Search ........... 502/103, 502/109, 117; 526/160, 131, 134, 904
See application file for complete search history.

(56) References Cited

U.S. PATENT DOCUMENTS

| 5,254,647 | A |   | 10/1993 | Yamamoto et al. ........... 526/65 |
| 5,484,862 | A |   | 1/1996  | Siddall et al. ................ 526/88 |
| 5,492,975 | A | * | 2/1996  | Peifer et al. ................. 525/274 |
| 5,942,589 | A |   | 8/1999  | Wunsch et al. ............. 526/346 |
| 6,040,261 | A | * | 3/2000  | Hlatky ....................... 502/117 |
| 6,096,677 | A |   | 8/2000  | Wilson, Jr. .................. 502/120 |
| 6,100,214 | A |   | 8/2000  | Walzer, Jr. et al. ......... 502/159 |
| 6,228,795 | B1 |  | 5/2001  | Vizzini ....................... 502/155 |
| 6,242,542 | B1 |  | 6/2001  | Beaudoin ..................... 526/87 |

FOREIGN PATENT DOCUMENTS

| CA | 2026552 | 3/1991 |
| KR | 1020020012346 A | 2/2002 |

* cited by examiner

*Primary Examiner*—Fred Teskin
(74) *Attorney, Agent, or Firm*—Cantor Colburn LLP

(57) ABSTRACT

The present invention relates to a catalyst system for preparing styrene polymer and a method of preparing styrene polymer using the same, more particularly to a catalyst system for preparing styrene polymer capable of preventing coagulation of polymer to the reactor by preventing gelation, offering high conversion ratio, simplifying polymer production and enabling product size control, and a method of preparing styrene polymer using the same.

17 Claims, 1 Drawing Sheet

CATALYST SYSTEM FOR PREPARING STYRENE POLYMER AND METHOD FOR PREPARING OF STYRENE POLYMER USING THE SAME

BACKGROUND OF THE INVENTION (a) Field of the Invention

The present invention relates to a catalyst system for preparing styrene polymer and a method of preparing styrene polymer using the same, more particularly to a catalyst system for preparing styrene polymer capable of preventing coagulation of polymer to the reactor by preventing gelation, offering high conversion ratio, simplifying polymer production and enabling product size control, and a method of preparing styrene polymer using the same.

(b) Description of the Related Art

Canada Patent No. 2,026,552 discloses a method of preparing styrene polymer having syndiotactic stereostructure using metallocene catalyst.

In general, methods of preparing polymers having syndiotactic stereostructure from styrene monomers are classified into the slurry method using inert organic solvent and the bulk method directly polymerizing monomers.

In the slurry method, a liquid phase polymerization reactor equipped with the conventional stirrer is used because gelation, which occurs during polymerization of syndiotactic styrene polymer in the bulk method, can be prevented. That is, no specially designed equipment is required. Also, continuous production is possible because the product is obtained in liquid phase. However, since the inert organic solvent should be at least 80% of reactants, a process of solvent separation and purification is indispensable. Also, since the catalytic activity is greatly decreased, this method is limited to catalyst development, testing and other small-scale processes and not appropriate for large-scale production.

The bulk method, wherein monomers are directly polymerized, is used dominantly because it requires no additional solvent separation and purification process and offers good catalytic activity. However, this method renders the problem of polymer coagulation on the reactor wall due to gelation. Thus, specially designed reactors are used to polymerize syndiotactic styrene monomers, which increases production cost and aggravates productivity.

A variety of reactors are being developed to solve the gelation problem. For example, U.S. Pat. No. 5,254,647 discloses a wiped surface reactor for preparing syndiotactic styrene polymer. This reactor mixes monomers using two pairs of conventional screws to prevent coagulation at low conversion range, where particle growth begins rapidly. Then, the monomers are transferred to a powder bed type reactor to prepare syndiotactic styrene polymer with high conversion ratio. Resultantly, relatively uniform polymer can be obtained despite of low mixing efficiency of the powder bed type reactor. However, the screw reactor has limited capacity and operability, and because the polymerization is performed at low conversion ratio the powder bed type reactor is indispensable to obtain high conversion ratio, which increases production cost.

U.S. Pat. No. 6,242,542 discloses a method and an apparatus of preparing syndiotactic styrene polymer by connecting back-mixing reactors in series or in parallel. And, U.S. Pat. No. 5,484,862 discloses an improved liquid phase powder bed type reactor. According to this patent, syndiotactic styrene polymer can be prepared continuously because a horizontal agitator disperses polymer powders used as initiator in liquid phase monomers.

However, all the conventional techniques focus on preventing gelation or breaking coagulated particles and cannot fundamentally solve the coagulation and adhesion problems during polymerization.

Accordingly, researches on method of preparing styrene polymer capable of preventing polymer coagulation by fundamentally preventing the gelation problem and offering high conversion ratio by maintaining polymerization catalytic activity are highly required.

SUMMARY OF THE INVENTION

It is an object of the present invention to provide a catalyst system for preparing styrene polymer capable of preventing polymer coagulation inside the reactor by fundamentally preventing the gelation problem, offering high conversion ratio by maintaining polymerization catalytic activity, simplifying preparing process and polymer production and enabling polymer particle size control.

It is another object of the present invention to provide a method of preparing styrene polymer capable of preventing polymer coagulation inside the reactor by fundamentally preventing the gelation problem and offering high conversion ratio by maintaining polymerization catalytic activity.

To attain the objects, the present invention provides a catalyst system for preparing styrene polymer comprising metallocene catalyst and cocatalyst supported on syndiotactic styrene polymer.

The present invention also provides a method of preparing styrene polymer comprising the step of polymerizing styrene monomers in the presence of said supported catalyst.

DETAILED DESCRIPTION OF THE PREFERRED EMBODIMENTS

Figure 1:
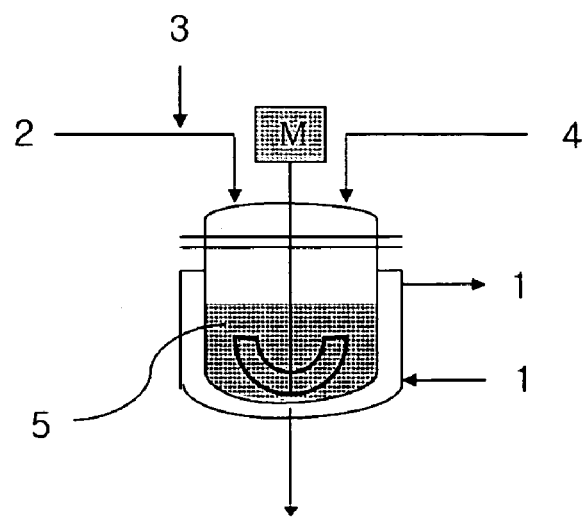
FIG. 1 is a schematic diagram of the styrene polymer preparing apparatus according to one embodiment of the present invention.

Hereinafter, the present invention is described in more detail.

The present inventors worked for a method of preparing styrene polymer capable of preventing polymer coagulation inside the reactor wall by fundamentally preventing the gelation problem and offering high conversion ratio by maintaining polymerization catalytic activity. In doing so, they discovered that styrene polymer prepared by polymerizing styrene monomers in the presence of supported catalyst on which metallocene catalyst and cocatalyst are supported on the syndiotactic styrene polymer does not experience any clue of polymer coagulation inside the reactor because gelation of the conventional bulk polymerization method is prevented fundamentally. And they also discovered that the conversion ratio of polymerizing styrene monomers in the present invention can be kept so much higher than that in slurry polymerization method because the rapid decrease of catalytic activity in slurry polymerization method can be avoided.

The present invention is characterized by a catalyst system for preparing styrene polymer comprising metallocene catalyst and cocatalyst supported on syndiotactic styrene polymer.

Said supported catalyst is prepared by polymerization in the presence of 100 to 2,000 moles of styrene monomers for 1 mol of metal included in metallocene catalyst, 1 mole of metallocene catalyst (based on metal content) and 1 to 2,000 moles of cocatalyst (based on metal content).

Styrene monomers used in the present invention are materials including the structure represented by the following Chemical Formula 1:

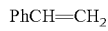    Chemical Formula 1 wherein Ph is a phenyl group substituted by at least one hydrogen atom, halogen atom, carbon atom, oxygen atom, phosphorus atom, sulfur atom or tin atom.

For said styrene monomers, divinylbenzene, trivinylbenzene or arylstyrene such as alkylstyrene, halogenated styrene, halogen-substituted alkylstyrene, alkoxystyrene, vinylbiphenyl, vinylphenylnaphthalene, vinylphenylpyrene, vinylphenylanthracene, trialkylsilylvinylbiphenyl, alkylsilylstyrene, alkyl ester styrene, carboxymethylstyrene, vinylbenzenesulfonate ester, vinylbenzyldialkoxy phosphide, p-divinylbenzene and m-divinylbenzene may be used. To be specific, alkylstyrene such as styrene, methylstyrene, ethylstyrene, butylstyrene, p-methylstyrene, p-tert-butylstyrene and dimethylstyrene; halogenated styrene such as fluorostyrene, chlorostyrene and bromostyrene; halogen-substituted styrene such as chloromethylstyrene and bromoethylstyrene; alkoxystyrene such as methoxystyrene, ethoxystyrene and butoxystyrene; vinylbiphenyl such as 4-vinylbiphenyl and 3-vinylbiphenyl; vinylphenylnaphthalene such as 1-(4-vinylbiphenylnaphthalene), 2-(4-vinylbiphenylnaphthalene), 1-(3-vinylbiphenylnaphthalene) and 1-(2-vinylbiphenylnaphthalene); vinylphenylpyrene such as 1-(4-vinylphenyl)pyrene and 2-(4-vinylphenyl)pyrene; vinylphenylanthracene such as 1-(4-vinylphenyl)anthracene and 2-(4-vinylphenyl)anthracene; trialkylsilylvinylbiphenyl such as 4-vinyl4-trimethylsilylbiphenyl; or alkylsilyistyrene such as o-trimethylsilylstyrene, m-triethylsilylstyrene and p-triethylsilylstyrene may be used.

Preferably, metallocene catalyst is comprised in 0.01 to 10 mol %, more preferably in 0.1 to 5 mol %, for said styrene monomers. If the metallocene catalyst content is below 0.1 wt %, the catalyst content inside the support becomes too low to offer enough catalytic activity. On the other hand, if it exceeds 5 mol %, the support content becomes too low compared with the catalyst content, so that the supporting effect decreases greatly.

For the metallocene catalyst used in the present invention, anything used in preparation of the conventional syndiotactic styrene polymer may be used. In general, group IV metal [titanium (Ti), zirconium (Zr), hafnium (Hf), vanadium (V), niobium (Nb), tantalum (Ta)] compounds are preferable for the metallocene catalyst. Titanium compound is more preferable.

For said cocatalyst, alkylaluminoxane, alkylaluminum compound or borate compound may be used. To be specific, alkylaluminoxane such as methylaluminoxane (MAO) and modified methylaluminoxane (MMAO), stability of which has been improved by adding alkylaluminum compound; alkylaluminum compound such as trimethylaluminum, triethylaluminum, dimethylaluminum chloride, diethylaluminum chloride, triisobutylaluminum, tri(n-butyl)aluminum, tri(n-propyl)aluminum and triisopropylaluminum (TIBAL); borate compound such as borane, triphenylcarbonium tetra (pentafluorophenyl)borate, o-cyano-N-methylpyridium tetra (pentafluorophenyl)borate, tri(pentafluorophenyl)boron, 1,1-dimethylferrocenium-tetra(pentafluorophenyl)borate and benzyldimethylferrocenium tetra(pentafluorophenyl) borate may be used. Particularly, triisobutylaluminum is preferable for the alkylaluminum compound.

Preferably, said cocatalyst is comprised in 1 to 2,000 times, more preferably 100 to 2,000 times, for 1 mole of metal included in the metallocene catalyst. If the cocatalyst content is below 1 mole, it is difficult to activate the metallocene catalyst. Otherwise, if it exceeds 2,000 moles, excess cocatalyst remains in the supported catalyst solution, so that it is difficult to control polymerization rate and the average molecular weight of polymer decreases.

To summarize, the catalyst for preparing styrene polymer of the present invention comprises metallocene catalyst and cocatalyst supported on syndiotactic styrene polymer. Preferably, said supported catalyst is prepared in inert organic solvent and dispersed at a concentration ranging from 0.00001 to 0.0005 Ti mol/L.

For said inert organic solvent, pentane, hexane, cyclohexane, heptane, octane, nonane, decane, benzene, pentafluorobenzene or toluene may be used. Preferably, the reaction is performed at a temperature ranging from 0 to 120° C., more preferably from 10 to 50° C. Preferably, the reaction time is 10 to 500 minutes, more preferably 30 to 200 minutes.

The reactor may have any shape if stirring can be performed uniformly. Particularly, a stirring reactor equipped with an external jacket to control the reaction temperature through heat transfer fluid is preferable.

The present invention also provides a method of preparing styrene polymer comprising the step of polymerizing styrene monomers in the presence of said catalyst system for preparing styrene polymer.

Said styrene polymer may be prepared by adding the catalyst system for preparing styrene polymer comprising metallocene catalyst and cocatalyst supported on syndiotactic styrene polymer and performing reaction for a given time or by adding the contents successively.

Preferably, said supported catalyst is the one dispersed in an inert organic solvent. Also, preferably, said styrene monomers are comprised in 0.1 to 50 times, more preferably 0.5 to 5 times, the volume of the inert organic solvent used in preparation of the supported catalyst. If its volume is smaller than 0.1 time, the polymerization activity decreases rapidly. On the other hand, if it exceeds 50 times, gelation cannot be avoided.

Preferably, said cocatalyst is comprised in 10 to 1,000 times for 1 mole of metallocene supported on the supported catalyst. As in the cocatalyst used in preparation of the supported catalyst, if the cocatalyst content is below 10 times, the metallocene supported catalyst may not be activated. Otherwise, if it exceeds 1,000 times, it is difficult to control the polymerization rate and to increase the average molecular weight of polymer.

Preferably, polymerization of said styrene polymer is performed at a temperature ranging from 0 to 120° C., more preferably from 50 to 90° C. And, preferably, stirring rate during the polymerization is controlled between 100 and 1,000 rpm.

Preferably, the resultant styrene polymer has an average particle size of 0.05 to 1 mm and a weight-average molecular weight of 10,000 to 2,000,000, more preferably 100,000 to 1,000,000.

Said styrene polymer has a conversion ratio of 10 to 100%, preferably 20 to 70%. Preferably, said styrene polymer has a syndiotacticity of at least 75%, more preferably at least 90%, in $C^{13}$ NMR analysis.

Figure 2:
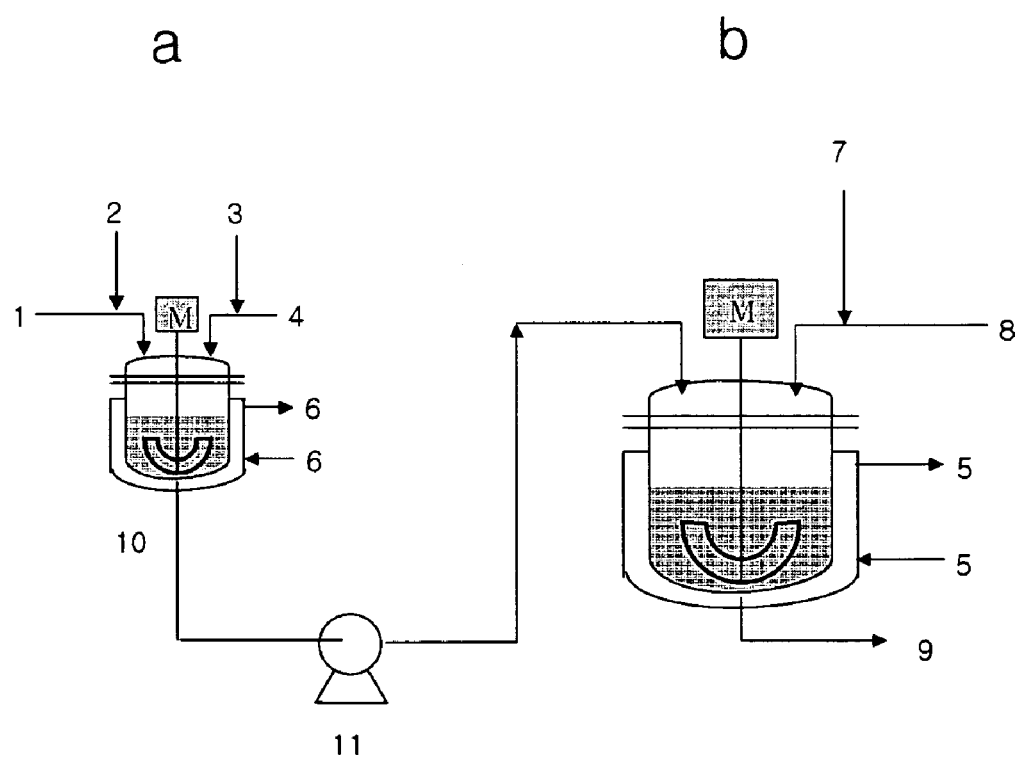
FIG. 2 is a schematic diagram of the continuous styrene polymer preparing apparatus according to one embodiment of the present invention.

Now, preparation of supported catalyst and styrene polymer according to the present invention is described referring to FIG. 1 and FIG. 2. FIG. 1 is a schematic diagram of the styrene polymer preparing apparatus according to one embodiment of the present invention, and FIG. 2 is a schematic diagram of the continuous styrene polymer preparing apparatus according to one embodiment of the present invention.

As seen in FIG. 1, purified inert organic solvent 5 is added to a stirring reactor set at a given temperature through heat transfer fluid 1. Then, weighed pure styrene monomers 2 and cocatalyst 3 are mixed and added to the reactor. After stirring, metallocene catalyst 4 diluted in inert organic solvent is added. Then, a supported catalyst wherein the metallocene catalyst is supported on the syndiotactic styrene polymer is prepared while stirring. Next, the temperature of the heat transfer fluid is controlled to set the temperature inside the reactor. Then, purified styrene monomers 2 and cocatalyst are added, and reaction is performed for a given time while stirring. Methanol is added to terminate the reaction, and the reaction mixture is filtered and dried to obtain styrene polymer.

FIG. 2 is a schematic diagram of the continuous styrene polymer preparing apparatus according to one embodiment of the present invention wherein two stirring reactors are connected in series. The supported catalyst prepared in FIG. 1 is transferred to a second reactor b to prepare syndiotactic styrene polymer continuously. To be more specific, the supported catalyst solution 10 prepared in the reactor a is transferred to the reactor b through a pump 11. At the same time, methylaluminoxane 7 mixed with the styrene monomers 8 is fed to the reactor b at a predetermined flow rate. The reaction time is controlled so that the reaction product 9 is collected continuously when polymerization is completed at the reactor b. Because the supported catalyst solution prepared in the reactor a is fed to the reactor b while the inert organic solvent 1, styrene monomers 2, cocatalyst 3 and metallocene catalyst 4 are fed to the reactor a at a predetermined rate, liquid phase styrene polymer having high polymerization conversion ratio can be prepared continuously.

Hereinafter, the present invention is described in more detail through Examples. However, the following Examples are only for the understanding of the present invention, and the present invention is not limited by the following Examples.

EXAMPLES

Example 1

Inside of a 1 L reactor was kept at 75° C. and cleaned by vacuuming for a day. The reactor inside was purged three times with high-purity argon gas. Then, the reactor was set at 25° C. 250 mL of purified n-heptane was added to the reactor, and then 0.5 mL of purified styrene monomers and 2.6 mL of methylaluminoxane (MAO, Albemarle; 4.68 wt % AL) solution were added to the reactor. After stirring for 10 minutes, 4.0 mL of pentamethylcyclopentadienyl titanium trimethoxide (Cp*Ti(OME)$_3$) solution (0.005 M) diluted with toluene was added. After about 1 hour of reaction while stirring, when the reaction mixture became turbid, the reactor temperature was raised to 70° C. for 10 minutes. After the reactor inside temperature became uniform at 70° C., 250 mL of purified styrene monomers, and then 3.9 mL of methylaluminoxane (MAO, Albemarle; 4.68 wt % AL) solution was added. Reaction was preformed for two hours while stirring at 600 rpm. A small amount of methanol was added to terminate the reaction. Liquid phase polymerization product was collected through the valve at the bottom of the reactor. The product was washed with excess methanol containing a small amount of hydrochloric acid and dried at a vacuum oven at 80° C. to obtain 73.7 g of styrene polymer.

Example 2

Styrene polymer was obtained in the same manner of Example 1 except for stirring at 1,000 rpm.

Example 3

65.2 g of styrene polymer was obtained in the same manner of Example 1 except for using a 50:50 (based on the aluminum molar ratio) solution of triisobutylaluminum (1 M) toluene solution and methylaluminoxane (MAO, Albemarle; 4.68 wt % AL) instead of methylaluminoxane (MAO, Albemarle; 4.68 wt % AL) solution as cocatalyst.

Example 4

5 L and 20 L stirring reactors were connected in series as in FIG. 2. Inside of the reactors was kept at 75° C. and was cleaned by vacuuming for a day. Inside of the reactors was purged three times with high-purity argon gas. Then, the 5 L reactor was set at 25° C. and the 20 L reactor was set at 70° C.

3,600 mL of purified n-heptane was added to the 5 L reactor, and then 10.3 mL of purified styrene monomers, 55.0 mL of methylaluminoxane (MAO, Albemarle; 4.68 wt % AL) solution and 56.0 mL of pentamethylcyclopentadienyl titanium trimethoxide (Cp*Ti(OME)$_3$) solution (0.0075 M) diluted with toluene were added to the reactor, successively. After about 1 hour of reaction while stirring, the reaction solution was transferred to the 20 L reactor using a pump.

After adding 3,600 mL of purified styrene monomers for 10 minutes, 82.5 mL of methylaluminoxane was added. Reaction was performed while stirring at 600 rpm. After an hour, 3,600 mL of supported catalyst solution was prepared for 1 hour in the 5 L reactor under the same condition as above. After an hour (2 hours after the reaction at the 20 L reactor), the supported catalyst solution prepared in the 5 L reactor, purified styrene monomers and methylaluminoxane solution were fed to the 20 L reactor at a flow rate of 30 mL/min, 30 mL/min and 0.70 mL/min, respectively, while the polymerization product was collected and the liquid level of the 20 L reactor was kept constant. Then, purified n-heptane, purified styrene monomers, methylaluminoxane solution and pentamethylcyclopentadienyl titanium trimethoxide (0.0075M) diluted with toluene were fed to the 5 L reactor at a flow rate of 30 mL/min, 0.10 mL/min, 0.45 mL/min and 0.45 mL/min, respectively, to continuously prepare supported catalyst and styrene polymer. The total time was 10 hours for normal continuous operation. The obtained styrene polymer weighed 4.78 kg.

Comparative Example

Inside of a 1 L reactor was kept at 70° C. and cleaned by vacuuming for a day. The reactor inside was purged three times with high-purity argon gas. Then, the reactor was set at 25° C. 250 mL of purified n-heptane was added to the reactor, and then 250 mL of purified styrene monomers and 6.5 mL of methylaluminoxane (MAO, Albemarle; 4.68 wt % AL) solution were added to the reactor. After stirring for 10 minutes, 4.0 mL of pentamethylcyclopentadienyl titanium trimethoxide (Cp*Ti(OME)$_3$) solution (0.005 M) diluted with toluene was added. After 3 hours of reaction while stirring at 600 rpm, a small amount of methanol was added to terminate the reaction. The polymerization product was collected and washed with excess methanol containing a small amount of hydrochloric acid, distilled and dried at a vacuum oven at 80° C. to obtain 43.7 g of styrene polymer.

Testing Example 1

Average diameter, conversion ratio, average molecular weight and syndiotacticity of styrene polymers prepared in Examples 1 to 4 and Comparative Example were measured. The result is shown in the following Table 1.

TABLE 1

| Classification | Example | | | | Comparative Example |
| --- | --- | --- | --- | --- | --- |
| | 1 | 2 | 3 | 4 | |
| Average diameter (mm) | 0.5 | 0.1 | 1 | 0.5 | 0.1 to 2 |
| Conversion ratio (%) | 32.5 | 33.1 | 28.8 | 29.4 | 19.3 |
| Average molecular weight | 587,000 | 534,000 | 551,000 | 511,000 | 488,000 |
| Syndiotacticity | 99% or higher | 99% or higher | 99% or higher | 99% or higher | 99% or higher |
| Yield | 99% or higher | 99% or higher | 99% or higher | 99% or higher | 75% |

In Examples 1 to 4, reaction product adhering to the reactor and stirrer wall was less than 1% of the total product. On the other hand, about 25% of product was adhering to the reactor and stirrer wall due to gelation in Comparative Example. In other words, while the yield of Examples 1 to 4 was 99% or higher, that of Comparative Example was only about 75%. That is, the catalyst system of the present invention prevents coagulation of polymer particles to the reactor wall by preventing gelation fundamentally.

Also, it offers high conversion ratio by maintaining polymerization catalytic activity, simplifies reaction and polymer production. In addition, it reduces the danger of electrostatic explosion by controlling particle size of the final product and reduces the dust generation problem due to powder transfer.

While the present invention has been described in detail with reference to the preferred embodiments, those skilled in the art will appreciate that various substitutions and modifications can be made thereto without departing from the spirit and scope of the present invention as set forth in the appended claims.

What is claimed is:

1. A catalyst system for preparing styrene polymer comprising metallocene catalyst and cocatalyst supported on syndiotactic styrene polymer, wherein said supported catalyst is dispersed in an inert organic solvent at a concentration ranging from 0.00001 to 0.0005 Ti mol/L.

2. The catalyst system for preparing styrene polymer of claim 1, wherein said supported catalyst is prepared from polymerization of styrene monomers in the presence of metallocene catalyst and cocatalyst.

3. The catalyst system for preparing styrene polymer of claim 1, wherein said supported catalyst is prepared by polymerization in the presence of 100 to 2,000 moles of styrene monomers for 1 mol of metal comprised in the metallocene catalyst, 1 to 2,000 moles of cocatalyst for 1 mole of metal comprised in the metallocene catalyst, and the metallocene catalyst comprising metal.

4. The catalyst system for preparing styrene polymer of claim 2, wherein said styrene monomers are one or more compounds having the structure represented by Chemical Formula 1:

PhCH=CH$_2$ wherein Ph is a phenyl group substituted by at least one hydrogen atom, halogen atom, carbon atom, oxygen atom, phosphorus atom, sulfur atom or tin atom.

5. The catalyst system for preparing styrene polymer of claim 1, wherein said metallocene catalyst is one or more compounds containing the metal selected from the group consisting of titanium (Ti), zirconium (Zr), hafnium (Hf), vanadium (V), niobium (Nb) and tantalum (Ta).

6. The catalyst system for preparing styrene polymer of claim 1, wherein said cocatalyst is one or more compounds selected from the group consisting of alkylaluminoxane, alkylaluminum compound and borate compound.

7. The catalyst system for preparing styrene polymer of claim 6, wherein said alkylaluminoxane is methylaluminoxane (MAO), or modified methylaluminoxane (MMAO).

8. The catalyst system for preparing styrene polymer of claim 6, wherein said alkylaluminum compound is one or more compounds selected from the group consisting of trimethylaluminum, triethylaluminum, dimethylaluminum chloride, diethylaluminum chloride, triisobutylaluminum, tri(n-butyl)aluminum, tri(n-propyl)aluminum and triisopropylaluminum (TIBAL).

9. The catalyst system for preparing styrene polymer of claim 6, wherein said borate compound is one or more compounds selected from the group consisting of borane, triphenylcarbonium tetra(pentafluorophenyl)borate, o-cyano-N-methylpyridium tetra(pentafluorophenyl)borate, tri (pentafluorophenyl)boron, 1,1-dimethylferrocenium-tetra (pentafluorophenyl)borate and benzyldimethylferrocenium tetra(pentafluorophenyl)borate.

10. The catalyst system for preparing styrene polymer of claim 1, wherein said supported catalyst is dispersed in one or more inert organic solvent selected from the group consisting of pentane, hexane, cyclohexane, heptane, octane, nonane, decane, benzene, pentafluorobenzene and toluene.

11. A method of preparing styrene polymer comprising the step of polymerizing styrene monomers in the presence of the supported catalyst of claim 1, wherein said supported catalyst is dispersed in an inert organic solvent at a concentration ranging from 0.00001 to 0.0005 Ti mol/L.

12. The method of preparing styrene polymer according to claim 11, wherein said supported catalyst is dispersed in one or more inert organic solvent selected from the group consisting of pentane, hexane, cyclohexane, heptane, octane, nonane, decane, benzene, pentafluorobenzene and toluene.

13. The method of preparing styrene polymer according to claim 11, wherein said styrene monomers are added in 0.1 to 50 times the volume of the inert organic solvent.

14. The method of preparing styrene polymer according to claim 11, wherein said supported catalyst is prepared by polymerization in the presence of 100 to 2,000 moles of styrene monomers for 1 mol of metal comprised in the metallocene catalyst, 1 to 2,000 moles of cocatalyst for 1 mole of metal comprised in the metallocene catalyst, and the metallocene catalyst comprising metal.

15. The method of preparing styrene polymer according to claim 11, wherein said polymerization is performed at a temperature ranging from 0° C. to 120° C.

16. The method of preparing styrene polymer according to claim 11, wherein said polymerization is performed at a stirring rate ranging from 100 to 1,000 rpm.

17. The catalyst system for preparing styrene polymer of claim 2, wherein said styrene monomers are selected from the group consisting of alkylstyrene, halogenated styrene, halogen-substituted alkylstyrene, alkoxystyrene, vinylbiphenyl, vinylphenylnaphthalene, vinylphenylpyrene, vinylphenylanthracene, trialkylsilylvinylbiphenyl, alkylsilylstyrene, alkylesterstyrene, carboxymethylstyrene, vinylbenzenesulfonate ester, vinylbenzyldialkoxyphosphide, divinylbenzene, trivinylbenzene and arylstyrene.

* * * * *